C. STOLL.
Mash-tuns.

No. 133,679.  Patented Dec. 3, 1872.

Witnesses.
Ernst Bilhuber.
Chas. Wahlers.

Inventor.
Charles Stoll
per
Van Santvoord & Hauff
attys

UNITED STATES PATENT OFFICE.

CHARLES STOLL, OF BROOKLYN, E. D., NEW YORK.

IMPROVEMENT IN MASH-TUNS.

Specification forming part of Letters Patent No. 133,679, dated December 3, 1872.

*To all whom it may concern:*

Be it known that I, CHARLES STOLL, of Brooklyn, E. D., in the county of Kings and State of New York, have invented a new and useful Improvement in Mash-Tuns; and I do hereby declare the following to be a full, clear, and exact description thereof, which will enable those skilled in the art to make and use the same, reference being had to the accompanying drawing forming part of this specification, in which drawing—

Figure 1:
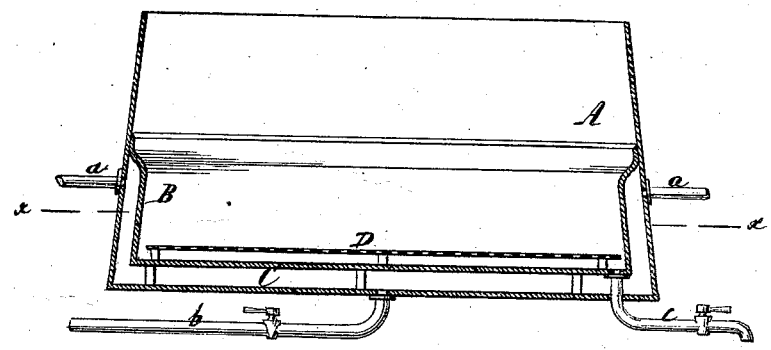
Figure 2:
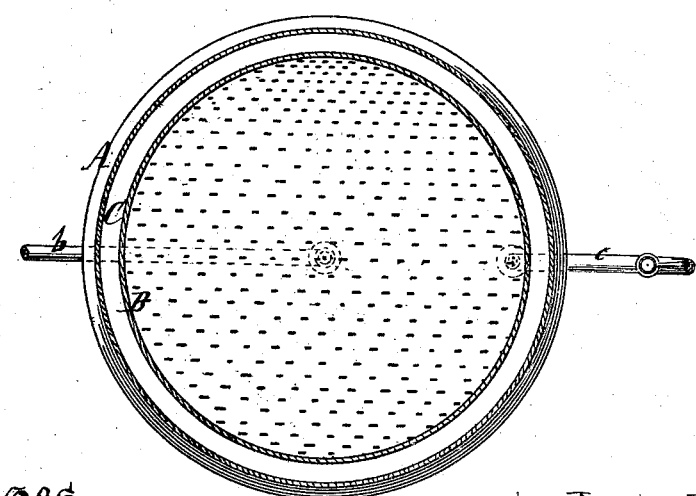

Figure 1 represents a vertical central section of my invention, and Fig. 2 is a horizontal section of the same in the plane $x\ x$, Fig. 1.

Similar letters indicate corresponding parts.

This invention consists in the arrangement of a heating-jacket in a mash-tun forming a heating-space which communicates with one or more steam-supply pipes and with one or more steam-discharge pipes, while the contents of the mash-tun can be drawn off through another pipe extending through the heating-space in such a manner that the mash can be heated in the mash-tun and kept at a uniform temperature during the process of mashing; and, furthermore, the temperature to which the mash is heated can be regulated with accuracy.

In the drawing, the letter A designates a mash-tun, which is made of boiler-iron or any other suitable material. With this mash-tun is combined a heating-jacket, B, which is secured in the interior, as shown in the drawing. By the jacket B a heating-space, C, is formed which communicates, by one or more pipes, $a\ a$, with a steam-generator, and from which the steam exhausts through a pipe, $b$. The contents of the mash-tun are drawn off through a pipe, $c$, which extends through the heating-space, and which is protected from being choked by an ordinary perforated drop-bottom, $d$. Within the jacket B is arranged a perforated false bottom, D, upon which the mash rests, and is so supported inside of the mash-tun that it can be readily removed for the purpose of cleansing the same when required.

By providing the mash-tun with a heating-space, as described, I am enabled to heat the mash in the tun itself, and consequently the boiler generally used for heating the mash can be dispensed with; and, furthermore, the mash in my tun can be easily kept at a uniform temperature during the entire process of mashing, while in ordinary mash-tuns the temperature of the mash soon decreases, whereby the product obtained is deteriorated.

By regulating the supply and discharge of the steam to and from the heating-jacket I am enabled to bring the temperature of the mash exactly to the desired degree and keep it there during the entire process of mashing.

It must be remarked that I have not represented the agitator or rake which is usually combined with mash-tuns. This device forms no part of my invention.

I do not broadly claim suspending a jacket within a mash-tun so as to create a heating-chamber between the two, for such is not of itself new.

What I claim as new, and desire to secure by Letters Patent, is—

The arrangement of the pipes $a\ b\ c$, heating-space C, jacket B, perforated false bottom D, and mash-tun A, all combined and operating substantially as described.

CHARLES STOLL.

Witnesses:
W. HAUFF,
JNO. D. PATTEN.